Figure 3:
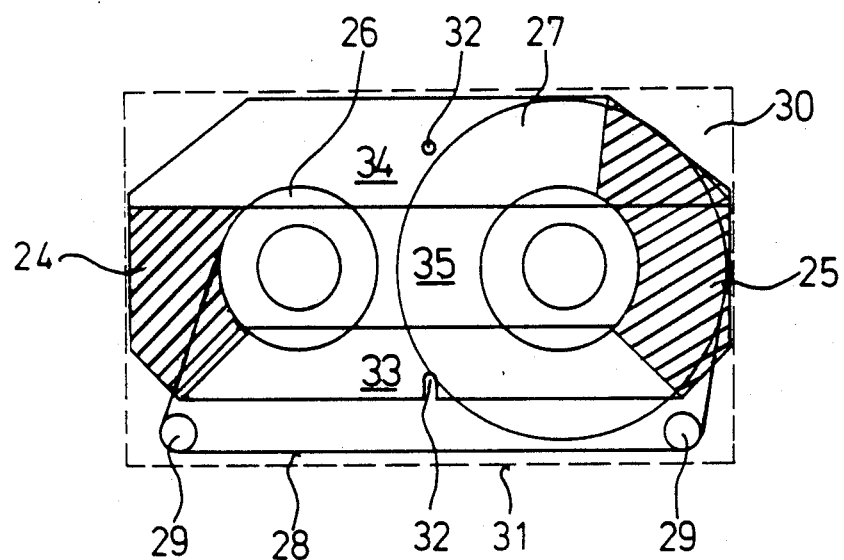

United States Patent [19]
Schaeffer et al.

[11] Patent Number: 4,632,334
[45] Date of Patent: Dec. 30, 1986

[54] TAPE CASSETTE, IN PARTICULAR A MAGNETIC TAPE CASSETTE, AND A REEL SUPPORT LINER THEREFOR

[75] Inventors: Norbert Schaeffer, Deidesheim; Dietmar Pfefferkorn, Hemsbach; Roland Sold, Mutterstadt; Uwe Brinkmann, Kehl; Ludwig Kreitner, Heppenheim, all of Fed. Rep. of Germany; Roland Sigwalt, Obenheim-Benfeld, France

[73] Assignee: BASF Aktiengesellschaft, Fed. Rep. of Germany

[21] Appl. No.: 844,670

[22] Filed: Mar. 27, 1986

[30] Foreign Application Priority Data

Apr. 2, 1985 [DE] Fed. Rep. of Germany ... 8509882[U]

[51] Int. Cl.⁴ .................... G03B 1/04; G11B 15/32; G11B 23/04
[52] U.S. Cl. .................................... 242/199; 360/132
[58] Field of Search ................ 242/192, 197–200; 360/95, 132, 137

[56] References Cited

U.S. PATENT DOCUMENTS

| 3,977,626 | 8/1976 | Gaiser et al. | 242/199 |
| 4,127,242 | 11/1978 | Hashimoto et al. | 242/199 |
| 4,333,620 | 6/1982 | Ishida et al. | 242/199 |
| 4,405,096 | 9/1983 | Possl | 242/199 |
| 4,438,892 | 3/1984 | Fitterer et al. | 242/199 |
| 4,466,036 | 8/1984 | Ishida et al. | 360/132 |
| 4,516,181 | 5/1985 | Shirako | 360/132 |

FOREIGN PATENT DOCUMENTS

2736760 1/1979 Fed. Rep. of Germany.
6483 10/1973 Japan.

*Primary Examiner*—Leonard D. Christian
*Attorney, Agent, or Firm*—Keil & Weinkauf

[57] ABSTRACT

In a tape cassette possessing symmetrically arranged support liners, a compressive force dependent on the tape roll diameter is exerted by the liner and utilized for centering the roll and the tape. Force/diameter relationships, and embodiments of folded liners for achieving individual forces are described. A novel dynamic liner arrangement can be used in any tape cassette possessing high winding speeds and sensitive tapes, with frequently alternating rewind/playback operation.

18 Claims, 11 Drawing Figures

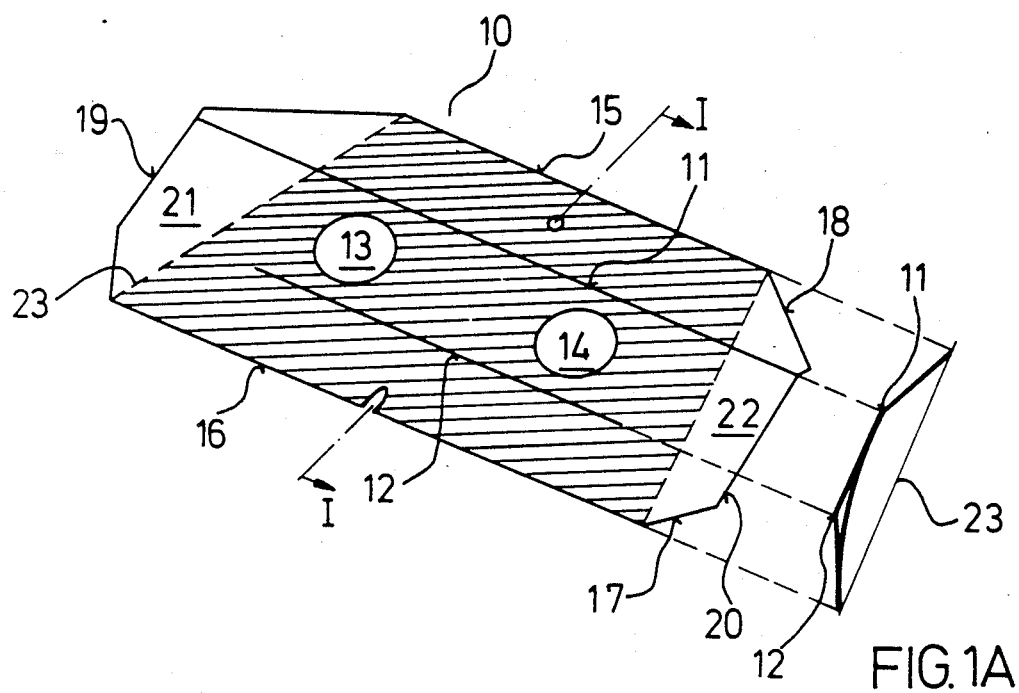
FIG.1
FIG.1A
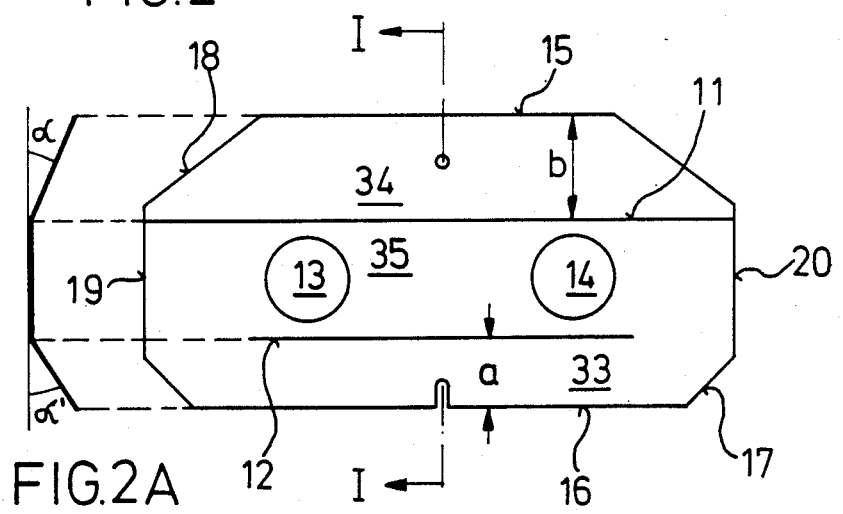
FIG.2
FIG.2A

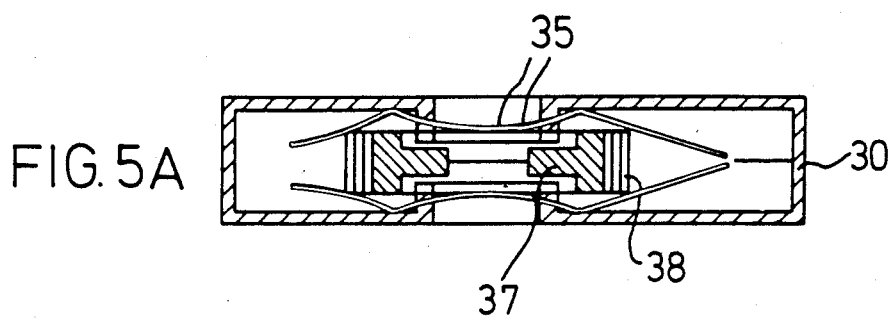
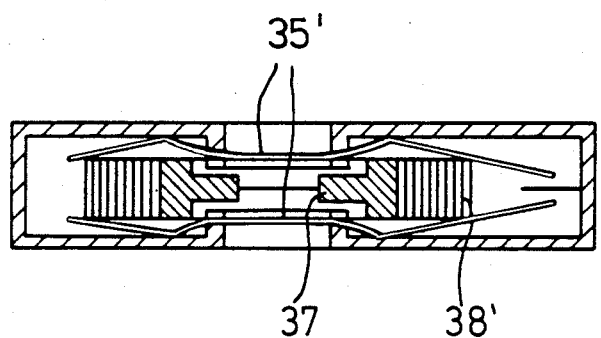
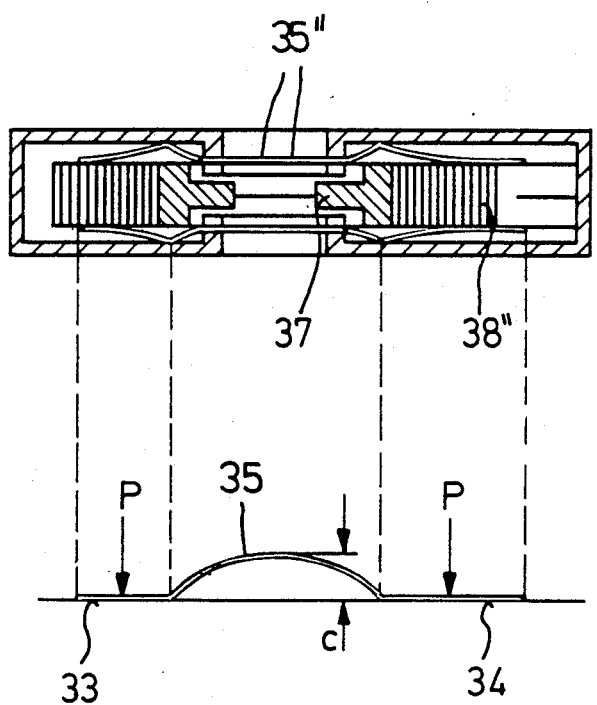

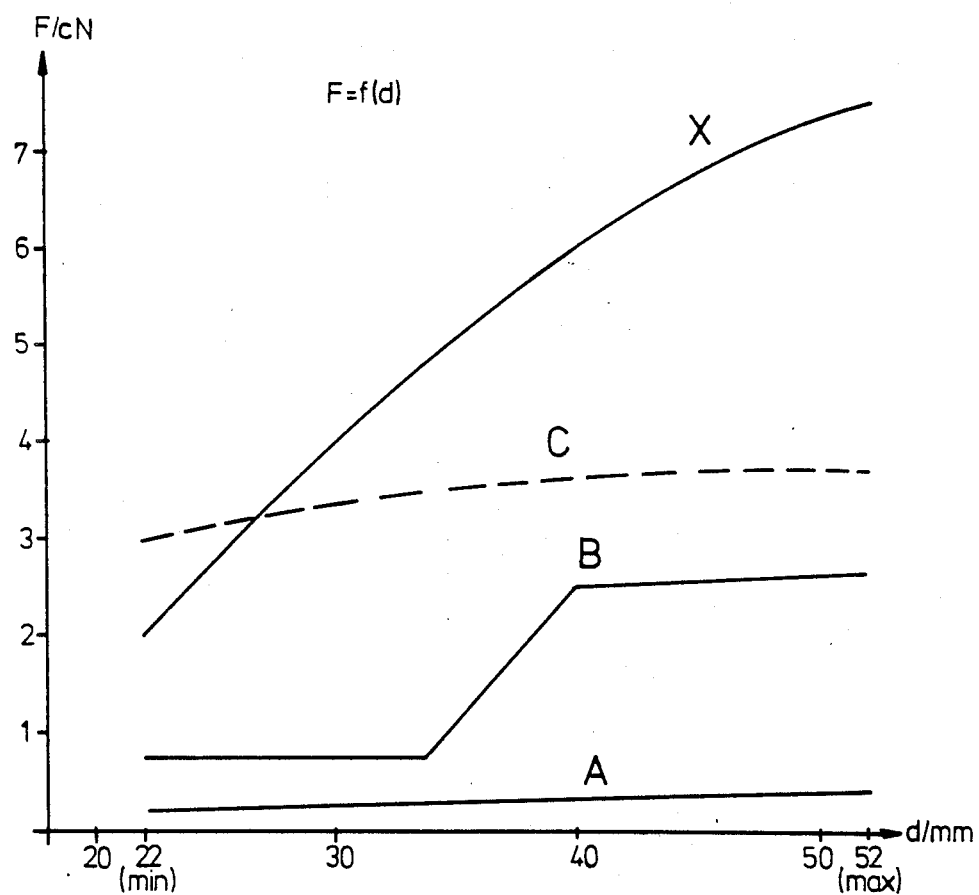

TAPE CASSETTE, IN PARTICULAR A MAGNETIC TAPE CASSETTE, AND A REEL SUPPORT LINER THEREFOR

The present invention relates to a tape cassette, in particular a magnetic tape cassette, comprising a cassette housing having top and bottom walls and front and back walls and at least one flangeless reel contained therein, said reel having an external diameter, and onto which reel the magnetic tape is wound into a tape roll and/or from which it is unwound, and at least two substantially rectangular liners being provided one on each side of the reel of wound tape between the latter and the top and bottom walls, respectively, said liners comprising peripheral bent-over liner portions which are bent over at an angle to and in a direction toward the central plane of the cassette and which exert a resilient pressure on the tape roll(s), said bent-over liner portions consisting in a back liner portion exerting a resilient pressure on a tape roll region facing the back wall of the cassette and a front liner portion exerting a resilient pressure on a tape roll region near the front wall of the cassette and a reel support liner therefor.

German Pat. No. 2,251,746 discloses a magnetic tape cassette possessing support liners of the type described at the outset. The folded-over liner edge areas begin between the circumferences of the tape roll which are determined by the half radius and the maximum radius, so that the guiding function begins only at half the roll diameter and consequently causes stepping, which in the worst case results in jamming of the tape roll in the cassette or at least in permanent damage to the tape. The central part of the known liner lies in each case absolutely flat against the inner wall of the cassette and therefore cannot exert any guiding or centering influence at the hub. When a bent-over front edge parallel to the longitudinal axis of the liner and located close to the front of the cassette is provided, or when lateral folds are present, the tape section which is being wound on or unwound is folded over or its edge is damaged, so that mechanical and electromagnetic damage occurs. Temporary contact between the liner and the said free tape section may also cause or increase wow and flutter. The known forms of liners also include circular channels arranged above and below each roll of tape and possessing inlet and outlet openings for the magnetic tape being wound on or unwound. Liners of this type are too expensive to produce and install by mass production methods.

Furthermore, U.S. Pat. No. 3,977,626 discloses liners which have at least radial or longitudinal folds or edges for centering the hubs, the folds or edges facing the hub, and which additionally have a guide channel at the back of the cassette to prevent slipping of the tape and jamming of the hub. The centering action on the hubs is relatively constant and independent of the particular operating situation of the cassette.

German Laid-Open Application DOS No. 2,736,760 discloses a liner for audio tape cassettes which is supposed to act directly on the hub by means of pressure folds and is supposed to effect uniform tape guidance just by hub centering. Apart from the said pressure folds, the conventional liner has no special properties and therefore acts as a completely flat gliding guide for the audio tape.

Japanese Preliminary Published Application No. 48/83 817 discloses a roof-shaped folded liner having radial incisions at its ends. The guide folds, which are located fairly far toward the outside relative to the maximum diameter of the tape roll, are disadvantageous since they cause stepping in the winding of the tape roll. Although the incisions reduce the spring force exerted by the liner on the tape section being wound on or unwound, the incisions nevertheless do not eliminate possible contact between the tape and parts of the liner, so that folding of the tape and tape damage may occur.

Furthermore, liners for magnetic tape cassettes have been disclosed (German Laid-Open Application DOS No. 2,732,083) which possess radial ribs which face the tape rolls and are located above and below these. These ribs serve for centering the tape roll but are provided in particular in the run-in and run-out area of each tape roll, so that the undesirable contact between tape and ribs occurs.

A known compact cassette possesses liners which each have three arc-shaped indentations parallel to one another, the two edges in between and the two longitudinal outer edges being supported on the particular inner wall of the cassette. Furthermore, the longitudinal outer edges are provided with projecting lobes which just overlap the maximum area of the tape roll toward the back of the cassette but do not extend over the entire tape roll toward the front of the cassette.

The middle arc is symmetrical with respect to the line joining the centers of the hubs. The lateral arcs lie with their central lines within the first half of the maximum radius of the roll or rolls of tape. Consequently, constant supporting forces act on the tape roll over a narrow strip, virtually over the entire radius, i.e. almost over the entire area of the roll, from the virtually empty to the fully wound hub. The central arc too exerts on the hubs, over a strip-like area, a pressure which is relatively constant over the entire area of the roll. In any case, the "strip-like" contact pressure is dependent on the shape of the arc and the spring properties of the material and is set unalterably during manufacture. Apart from acting as sliding surfaces in particular areas and from time to time, the edge parts of the liner, between the central lines of the lateral arcs and the outer edge of the projecting lobes, do not perform any guidance function at all for the roll or rolls of tape. Merely the central arc exerts a constant contact pressure on the hubs over a strip-like area.

This results in a retaining force being exerted on the hub or hubs over a narrow area; this measure is not sufficient for centering. Another disadvantage is that, because the beginning of the arc shape of the lateral arcs is located at the periphery of the hub, even the first tape windings are not wound concentrically on the hub. Furthermore, the outer tape windings of the full tape roll are scarcely held effectively by means of the projecting lobes.

It is an object of the present invention to provide a tape cassette with support liners which has advantages in terms of large-scale serial production as well as advantages for the user during operation; in particular, it is intended to improve the winding and running characteristics of the cassettes.

We have found that this object is achieved by a tape cassette of the type defined at the outset if each of the liners has at least two substantially longitudinal folds which limit said back and front bent-over liner portions, said folds being arranged at a distance equal to or smaller than the external diameter of the reel and intended for contacting the inner surfaces of said top and bottoms walls of the cassette, and the two folds limit a middle part between them, and wherein by said liners bearing with said folds, arranged at said distance from one another, against the respective inner surface of the top and bottom walls, and by said peripheral liner portions bent over at a certain angle towards the central plane of the cassette and exerting said resilient pressure on the tape roll, a bending force is produced on said middle part of each liner which as a result arches towards said reel(s) and exerts a pressure force thereon, which pressure force has a minimum value when acting on an empty reel and a maximum value when acting on a reel carrying a full tape roll.

Consequently, centering of the tape roll or rolls is improved while at the same time greater protection is afforded against folding and slipping of the tape, so that the winding speeds used in the loading operation during production of the cassette can be increased several times compared with conventional tape cassettes which possess conventional liners having an essentially constant spring characteristic.

In a practical embodiment, the back bent-over liner portions can be formed by a continuous longitudinal fold extending as far as the narrower side of the liner.

Advantageously, the front bent-over liner portion can be formed by at least one fold which substantially extends in the longitudinal direction of the liner, ends before the run-in or run-out area of the tape, where the latter is being wound onto or unwound from the tape roll, and causes the run-in and run-out area of the liner to curve.

This ensures simple liner design and production, which can be effected by cold stamping or hot stamping.

In another embodiment, the pressure force exerted on the reel is intended to increase continuously from the minimum value (empty reel) to the maximum value (full reel).

Surprisingly, these force characteristics can be archieved in practice and ensure that, as the roll diameter increases, the centering forces also increase in order systematically to counteract the greater troublesome forces which are then effective and may influence the rotation of the tape roll and/or winding of the tape. Furthermore, the empty reel is held just sufficiently centrally by the minimum pressure force so that especially the first tape windings are wound on cleanly.

Advantageously, the pressure force should be set so that the minimum value is from about 1 to about 4 cN (centinewton), preferably about 2 cN, and the maximum value from about 7 to about 15 cN, preferably about 10 cN. Such force characteristics can advantageously be achieved using as the liner material a 50 μm thick polyester film whose edge areas are folded toward the horizontal plane or the central plane of the cassette through an angle of from about 8° to 30°, in particular from about 10° to about 25°.

The stated stamping methods make it possible to obtain the desired angle and hence the desired pressure forces simply and economically on a large scale.

The gradient of the pressure force as a function of the instantaneous tape roll diameter is advantageously from about 0.1 to about 0.3 cN/mm (centinewton per millimeter), and preferably falls from about 0.3 cN/mm in the region of the minimum compressive force to about 0.1 cN/mm in the region of the maximum pressure force.

In a practical embodiment, the front bent-over liner portion can be folded through about 13°–20° and the back bent-over liner portion through about 20°, the angles being with respect to the horizontal plane or the central plane of the cassette. Folding through these angles gives pressure forces which are adequate in practice if the said 50 μm polyester film is used.

In an advantageous embodiment, the distance of the longitudinal fold for the back bent-over liner portion from the back edge of the liner is greater than the distance of the longitudinal fold for the front bent-over liner portion from the front edge thereof. Consequently, greater pressure forces can be exerted on the tape roll area at the back of the cassette than on the tape roll area close to the front of the cassette.

In a version of the solution according to the invention, the liner may possess, in the run-in and run-out areas, cutouts through which the tape passes in the region of the periphery of the tape roll.

In another embodiment of the invention, tape guide elements which guide the tape to and from the periphery of the roll can be provided in the run-in and run-out areas of the liners.

The invention also embraces all liner embodiments and combinations which are referred to in the claims.

Figure 4:
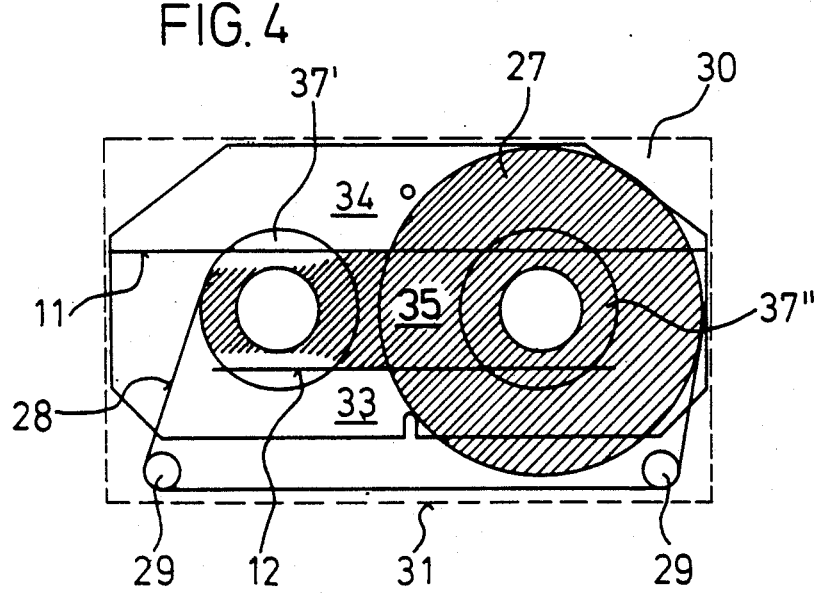

The invention is illustrated by the examples described below and shown in the drawings. In the drawings, FIG. 1 shows a perspective view of a novel support liner, which is not under load, FIG. 1A shows a side view of the liner according to FIG. 1, FIG. 2 shows a plan view of the liner of FIG. 1, FIG. 2A shows a cross-section through the liner along the line I—I, FIG. 3 shows a novel liner with curved areas, in a cassette shown schematically, FIG. 4 shows a liner with areas of contact with the reel and the tape roll, in a cassette shown schematically, FIGS. 5A–5C show a cross-sectional view of a cassette with various sizes of tape roll and FIG. 6 shows a cross-sectional view of a novel liner having loaded edge areas.

FIG. 7 is a graphic representation of the effective pressure force and the holding force F as a function of the instantaneous diameter of the associated tape roll.

The liner 10 is shaped like a sloping roof, the continuous longitudinal folded edge or "fold" 11 being the highest line. The second highest line, the non-continuous folded edge 12, ends substantially before the narrow edges 19 and 20 of the liner and extends beyond the circular cutouts 13 and 14. The longitudinal outer edges 15 and 16 rest on the flat supporting plane 23, which is shown hatched. All other contour edges, obliques 17 and 18 and narrow edges 19 and 20 make no contact with the supporting plane. Thus, the drawing shows clearly that the narrow ends 21 and 22 project beyond the supporting plane 23.

FIG. 1A shows that the narrow ends 21 and 22 have a rounded curvature which is formed by virtue of the fact that the fold 12 does not extend as far as the narrow edges 19 and 20 but ends substantially before these. FIG. 3 shows how far the curved areas 24 and 25 extend in spatial relationship with the position of the tape rolls 26 and 27 in a two-reel cassette 30, in particular a compact cassette. In this cassette, the tape 28 is guided over guide rolls 29, along the front 31 of the cassette 30, where the head (not shown) comes into contact with the tape 28. 32 denotes holding pins for the liner 10, which itself possesses appropriate cutouts.

The sections of the tape 28 being wound onto the particular periphery of the tape roll or being unwound from this are located within the curved areas 24 and 25, within which the liners 10 are intended to guide the tape 28 in order to be able to wind or unwind the tape in a predetermined position. The fold 12 does not continue as far as the narrow edges 19 and 20, in order that effects on tape running, such as folding, deflecting, etc., and tape damage, such as abrasion of the tape edges, etc. are avoided. The shape and position of the curved areas 24 and 25 can be varied by varying the length of the non-continuous fold 12.

As shown in FIG. 2, the main part of the liner 10 is bent over toward the central plane of the cassette 30 so that it is roof-shaped. The area of this main part coincides roughly with the shaded supporting plane 23 of FIG. 1. The supporting plane 23 essentially corresponds to the central plane of the cassette within the cassette 30.

The liner 10 possesses, at the rear, the back bent-over liner portion or area 34, which is located between the longitudinal fold 11 and the back edge 15, and possesses at the front the front bent-over liner portion or area 33 which is located between the fold 12 and the front edge 16 of the liner 10. Provided that the liner material is a 50 $\mu$m thick polyester film of type RN50 from Kalle, Wiesbaden, both areas of the liners should be folded over through angles $\alpha,\alpha'$ of from about 8° to about 30°, in particular from about 10° to about 25°, with respect to a horizontal plane, for example the central plane of the cassette 30 or the middle part of the liner in an unloaded state. In practice, and with the selected dimensions for the liner areas 33 and 34, an angle $\alpha'$ of from 13° to 20° in the front area 33 and an angle $\alpha$ of 20° in the back area 34 have proven advantageous, although folds through other angles which can easily be achieved by the stamping method are also possible. A practical folding angle $\alpha'$ is 20°, which, however, is established only in the middle of area 33. The run-in and run-out areas then have an angle of about 13°. In the example, the distance (a) between the fold 12 and the front edge 16 of the liner 10 is smaller than the distance (b) between the fold 11 and the back edge 15, so that the corresponding lever arms are such that (b)>(a).

Surprisingly, the pressure forces or holding forces of the liners 10 in their middle part 35 can be set by means of the magnitudes of the angles $\alpha,\alpha'$ and the lever arms (a) and (b), and, starting from a basic setting, for example for an empty reel ("reel", as used herein, has the same meaning as "hub" if it is substantially flangeless), a pressure force or holding force dependent on the instantaneous actual diameter of the tape roll can advantageously be exerted on the reel or reels. This pressure force or holding force, which serves to hold and center the reel or reels and hence also the tape roll present thereon at the time, can in practice be varied from about 1 to about 4 cN (for an empty reel) and from about 7 to about 10 cN (for a reel with a full tape roll), and is preferably about 2 cN and 7.5 cN, respectively. Surprisingly, the pressure forces on the tape roll in the back area 34, at about 1-4 cN, are greater than those in the front area 33, which are about 0.5-3 cN.

The variable pressure exerted on the reels with or without the tape roll is illustrated in FIGS. 5A to 5C. In FIG. 5A, the reel 37 in the cassette 30 is wound with only a few tape windings, i.e. carries a very small tape roll 38; this tape roll is larger in FIG. 5B, where it is denoted by 38', and reaches its full size in FIG. 5C, where it is denoted by 38". Comparison of the curvatures of the arched parts of the middle part 35 of the liner shows that the greatest curvature (35') is present with the shortest contact line in FIG. 5A; in FIG. 5B, at half roll diameter, this curvature becomes substantially smaller and the contact line (35') becomes longer; in FIG. 5C, the said curvature becomes even smaller and the contact line (35") reaches its longest length. In practice, the pressure forces and holding forces are from about 2 to 3 cN in FIG. 5A, from 4 to 6 cN in FIG. 5B and from 6.5 to 7.5 cN in FIG. 5C.

The continuous dependence of the pressure force and holding force on the instantaneous actual diameter of the tape roll is evident from the measured curves in FIG. 7, as described below.

FIG. 6 shows the liner 10 when the lateral bent-over areas 33 and 34 are pressed flat by loads P, causing the middle part 35 to curve. For a compact cassette containing a 50 $\mu$m polyester film, the height c of the curvature of the liner 10 is about 1.5 mm.

In the unloaded polyester film, the height of the rear fold 11 was about 6±1 mm and that of the front fold 12 was 4±0.5 mm. The measurements below are also based on these values.

The curvature and the resulting spring characteristics are adequate for the conditions in the compact cassette having a free internal distance between the hub and the inner wall of 2×0.6 mm, and give excellent results in respect of stability and tape running.

FIG. 4 shows the instantaneous contact conditions in the cassette 30 when one reel is empty and the other is fully wound. It is clear that the light reel 37' is held with a smaller pressure force and holding force than hub 37". Furthermore, the tape roll 27 is held on both sides by the areas 33 and 34 of the liner, although with a smaller pressure force and holding force of from about 0.5 to about 4 cN.

With these force conditions, it is possible to produce cassettes which have excellent tape running and winding properties and whose measured mechanical and dynamic characteristics are outstanding.

FIG. 7 shows the curves F=f (d), i.e. the effective pressure force and holding force F as a function of the instantaneous diameter of the tape roll. The external reel diameter is 22 mm and the maximum tape roll diameter 52 mm, and the beginning and end of the measuring range is therefore defined by these values.

The pressure forces F were measured in each case for different roll diameters, using aluminum disks of different diameters and a load cell, by the inductive transducer principle. The load cell was supplied by Hottinger-Baldwin.

In carrying out the experiment, the liners in the bottom part of the cassette are simulated by positioning the disks and measuring the forces which have to be applied to compress the liner to a residual height of 0.6 mm, corresponding to the space between the lateral surface of the tape roll and the inner wall of the cassette.

The curves of FIG. 7 denote the following types of liners:
(A) arc-type liner of the above, known compact cassette of type UDI, from a Japanese manufacturer,
(B) the Applicant's liner folded to form a Z-shape, similar to German Pat. No. 2,251,746,
(C) Teflon liner with circular indentations and (X) the dynamic liner described, of the present invention.

Discussion of curves:

Curves A and C show virtually constant pressure force behavior over the entire measuring range. They therefore act as a static glide cushion without any dynamic properties. Curve B exhibits dynamic behavior for a short time, over an interval corresponding roughly to diameters between 33 and 40 mm, but overall shows a step-like pressure force curve which makes corresponding step formation in the roll likely.

Curve X shows a steady, ascending curve whose gradient is from 0.3 to 0.1 cN/mm (the latter value in the upper diameter range).

Accordingly, a full tape roll is held with a force of about 7.5 cN compared with about 2 cN for an empty hub. The increase in weight can therefore be compensated, and a full roll is held, and hence centered, in virtually just as stable a manner as the empty hub.

When the novel X liner was used, it was possible to increase the speed at which the tape was wound into empty cassettes in the loading operation to about 4 times the speed for cassettes containing glide liners (e.g. A and C, see above). Wind-on speeds of 15 and 35 m/sec were achieved in practice and good winding results were obtained (smooth tape roll).

There were the following advantages during operation of the cassette:

because of the mechanical and dynamic improvements to winding and centering, substantially smaller fluctuations in output level were measured compared with conventional cassettes. The occurrence of mechanical errors due to jamming and folding could be substantially reduced, for example by a factor of 4 compared with compact cassettes containing the Z liner (curve B in FIG. 7). It was also possible to reduce the running noise by a factor of about 2. By means of the non-continuous fold 12, it was possible for errors due to folding of the tape to be virtually completely eliminated.

We claim:

1. A tape cassette, in particular a magnetic tape cassette, comprising a cassette housing having top and bottom walls and front and back walls and at least one flangeless reel contained therein, said reel having an external diameter, and onto which reel the magnetic tape is wound into a tape roll and/or from which it is unwound, and at least two substantially rectangular liners being provided one on each side of the reel of wound tape between the latter and the top and bottom walls, respectively, said liners comprising peripheral bent-over liner portions which are bent over at an angle to and in a direction toward the central plane of the cassette and which exert a resilient pressure on the tape roll(s), said bent-over liner portions consisting in a back liner portion exerting a resilient pressure on a tape roll region facing the back wall of the cassette and a front liner portion exerting a resilient pressure on a tape roll region near the front wall of the cassette, wherein each of the liners has at least two substantially longitudinal folds which limit said back and front bent-over liner portions, said folds being arranged at a distance equal to or smaller than the external diameter of the reel and intended for contacting the inner surfaces of said top and bottom walls of the cassette, and the two folds limit a middle part between them, and wherein by said liners bearing with said folds, arranged at said distance from one another, against the respective inner surface of the top and bottom walls, and by said peripheral liner portions bent over at a certain angle towards the central plane of the cassette and exerting said resilient pressure on the tape roll, a bending force is produced on said middle part of each liner which as a result arches towards said reel(s) and exerts a pressure force thereon, which pressure force has a minimum value when acting on an empty reel and a maximum value when acting on a reel carrying a full tape roll.

2. A cassette as claimed in claim 1, wherein the back bent-over liner portion is formed by a continuous longitudinal fold extending as far as the narrow sides of the liner.

3. A cassette as claimed in claim 1, wherein the front area of the liner is formed by at least one fold which extends essentially in the longitudinal direction of the liner, ends before the run-in and run-out area of the tape at the tape roll and causes the run-in and run-out area of the liner to curve.

4. A cassette as claimed in claim 1, wherein the pressure force exerted on the reel increases continuously from the minimum value to the maximum value.

5. A cassette as claimed in claim 1, wherein the minimum value of the pressure force is from about 1 to about 4 cN, and the maximum value is from about 7 to 15 cN.

6. A cassette as claimed in claim 5, wherein the minimum value is about 2 cN and the maximum value about 10 cN.

7. A cassette as claimed in claim 1, wherein the gradient of the pressure force as a function of the instantaneous tape roll diameter is from about 0.1 to about 0.3 cN/mm, and decreases from about 0.3 cN/mm in the region of the minimum pressure force to about 0.1 cN/mm in the region of the maximum pressure force.

8. A cassette as claimed in claim 1, wherein the gradient of the compressive force as a function of the instantaneous tape roll diameter decreases from about 0.3 cN/mm in the region of the minimum pressure force to about 0.1 cN/mm in the region of the maximum pressure force.

9. A cassette as claimed in claim 1, wherein a 50 $\mu$m thick polyester film is folded through an angle of about 8°–30° toward the central plane of the cassette.

10. A cassette as claimed in claim 9, wherein a 50 $\mu$m thick polyester film is folded through an angle of about 10°–25° toward the central plane of the cassette.

11. A cassette as claimed in claim 1, wherein the front bent-over liner portion is folded through about 13°–20° and the back bent-over liner portion through about 20°, the angles being relative to the central plane of the cassette.

12. A cassette as claimed in claim 1, wherein the distance of the longitudinal fold for the front bent-over liner portion from the front edge of the liner is smaller than the distance of the longitudinal fold for the back bent-over liner portion from the back edge of the liner.

13. A cassette as claimed in claim 1, wherein the liner possesses, in the run-in and run-out area, cutouts through which the tape passes in the region of the periphery of the tape roll.

14. A cassette as claimed in claim 1, wherein tape guide elements which guide the tape to or from the periphery of the tape roll are provided in the run-in and run-out area of the tape.

15. A tape cassette, in particular a magnetic tape cassette, comprising a cassette housing having top and bottom walls and front and back walls and at least one flangeless reel contained therein, said reel having an external diameter, and onto which reel the magnetic tape is wound into a tape roll and/or from which it is unwound, and at least two substantially rectangular liners being provided one on each side of the reel of wound tape between the latter and the top and bottom walls, respectively, said liners comprising peripheral bent-over liner portions which are bent over at an angle to and in a direction toward the central plane of the cassette and which exert a resilient pressure on the tape roll(s), said bent-over liner portions consisting in a back liner portion exerting a resilient pressure on a tape roll region facing the back wall of the cassette and a front liner portion exerting a resilient pressure on a tape roll region near the front wall of the cassette, wherein

- each of the liners has at least two substantially longitudinal folds which limit said back and front bent-over liner portions, said folds being arranged at a distance equal to or smaller than the external diameter of the reel and intended for contacting the inner surfaces of said top and bottom walls of the cassette, and the two folds limit a middle part between them, and wherein
- by said liners bearing with said folds, arranged at said distance from one another, against the respective inner surface of the top and bottom walls, and
- by said peripheral liner portions bent over at an angle in the range from about 10° to about 25° towards the central plane of the cassette and exerting said resilient pressure on the tape roll,
- a bending force is produced on said middle part of each liner which as a result arches towards said reel(s) and exerts a pressure force thereon in the range from about 2 cN to about 10 cN, which pressure force has a minimum value of about 2 cN when acting on an empty reel and a maximum value of about 10 cN when acting on a reel carrying a full tape roll.

16. A tape cassette, in particular a magnetic tape cassette, comprising a cassette housing having top and bottom walls and front and back walls and at least one flangeless reel contained therein, said reel having an external diameter, and onto which reel the magnetic tape is wound into a tape roll and/or from which it is unwound, and at least two substantially rectangular liners being provided one on each side of the reel of wound tape between the latter and the top and bottom walls, respectively, said liners comprising peripheral bent-over liner portions which are bent over at an angle to and in a direction toward the central plane of the cassette and which exert a resilient pressure on the tape roll(s), said bent-over liner portions consisting in a back liner portion exerting a resilient pressure on a tape roll region facing the back wall of the cassette and a front liner portion exerting a resilient pressure on a tape roll region near the front wall of the cassette, wherein

- each of the liners has at least two folds which limit said back and front bent-over liner portions, said folds being arranged at a distance equal to or smaller than the external diameter of the reel and intended for contacting the inner surfaces of said top and bottom walls of the cassette, and the two folds limit a middle part between them, and wherein
- by said liners bearing with said folds, arranged at said distance from one another, against the respective inner surface of the top and bottom walls, and
- by said peripheral liner portions bent over at an angle in the range from about 10° to about 25° towards the central plane of the cassette and exerting said resilient pressure on the tape roll,
- a bending force is produced on said middle part of each liner which as a result arches towards said reel(s) and exerts a pressure force thereon, the gradient of which pressure force as a function of the instantaneous tape roll diameter decreasing from about 0.3 cN/mm, when the pressure force acts on an empty reel, to about 0.1 cN/m, when the pressure force acts on a reel carrying a full tape roll.

17. A liner with a substantially rectangular shape for a tape cassette as claimed in claim 1, having bent-over liner portions which comprise a back bent-over liner portion at the back wall of the cassette and a front bent-over liner portion at the front wall of the cassette, wherein the liner possesses, in the central region, two longitudinal folds which are separated by a distance equal to or smaller than the external diameter of the reel of the cassette and are intended to bear against the inner surfaces of the bottom and top wall of the cassette and between which a relatively flat middle part is provided, and the back and front bent-over portions of the liner are folded through an angle of from about 10° to about 25° with respect to the relatively flat middle part, so that the liner exerts pressure forces of from about 2 to about 10 cN on the periphery of the empty hub or on the tape roll.

18. A cassette as claimed in claim 5, wherein a 50 μm thick polyester film is folded through an angle of about 8°–30° toward the central plane of the cassette.

* * * * *